US012802891B2

(12) United States Patent
Aoyama et al.

(10) Patent No.: US 12,802,891 B2
(45) Date of Patent: Nov. 17, 2026

(54) ELECTROLYTIC CAPACITOR AND METHOD FOR MANUFACTURING ELECTROLYTIC CAPACITOR

(71) Applicant: Panasonic Intellectual Property Management Co., Ltd., Osaka (JP)

(72) Inventors: Tatsuji Aoyama, Kyoto Fu (JP); Shumpei Matsushita, Yamaguchi Ken (JP); Tomoyuki Tashiro, Yamaguchi Ken (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 110 days.

(21) Appl. No.: 18/832,547

(22) PCT Filed: Jan. 27, 2023

(86) PCT No.: PCT/JP2023/002692
§ 371 (c)(1),
(2) Date: Jul. 24, 2024

(87) PCT Pub. No.: WO2023/145893
PCT Pub. Date: Aug. 3, 2023

(65) Prior Publication Data
US 2025/0095923 A1 Mar. 20, 2025

(30) Foreign Application Priority Data
Jan. 28, 2022 (JP) ................................ 2022-012070

(51) Int. Cl.
*H01G 9/028* (2006.01)
*H01G 9/00* (2006.01)
(Continued)

(52) U.S. Cl.
CPC ........... *H01G 9/028* (2013.01); *H01G 9/0036* (2013.01); *H01G 9/035* (2013.01); *H01G 9/151* (2013.01)

(58) Field of Classification Search
None
See application file for complete search history.

(56) References Cited

U.S. PATENT DOCUMENTS 8,767,377 B2 * 7/2014 Aoyama ................ H01G 11/56 361/511
10,068,713 B2 * 9/2018 Andoralov ........... H01G 9/0036
(Continued)

FOREIGN PATENT DOCUMENTS

JP 2019-516241 A 6/2019
WO WO-2012132248 A1 * 10/2012 ........... H01G 9/0029
(Continued)

OTHER PUBLICATIONS

Translation of WO '546 (Year: 2015).*
(Continued)

*Primary Examiner* — Dion R. Ferguson
(74) *Attorney, Agent, or Firm* — Rimon P.C.

(57) ABSTRACT

A disclosed electrolytic capacitor includes a stacked body and a liquid component with which the stacked body is impregnated. The stacked body includes an anode foil having a dielectric layer formed on a surface thereof, a cathode foil, a separator, and conductive polymer layers. The conductive polymer layers include a first conductive polymer layer formed on the dielectric layer, a second conductive polymer layer formed on the cathode foil, and a third conductive polymer layer formed on the separator. The first conductive polymer layer and the third conductive polymer layer are in contact with each other at a first interface, and the second conductive polymer layer and the third conductive polymer layer are in contact with each other at a second
(Continued)

interface. When the amount of the liquid component contained in the stacked body has decreased, an electrical resistance between the first conductive polymer layer and the third conductive polymer layer and an electrical resistance between the second conductive polymer layer and the third conductive polymer layer increase.

11 Claims, 2 Drawing Sheets

(51) Int. Cl.
*H01G 9/035* (2006.01)
*H01G 9/15* (2006.01)

(56) References Cited

U.S. PATENT DOCUMENTS

| | | | | |
|---|---|---|---|---|
| 11,152,161 | B2* | 10/2021 | Andoralov | H01G 11/48 |
| 11,398,357 | B2* | 7/2022 | Andoralov | H01G 11/04 |
| 2012/0212880 | A1* | 8/2012 | Ishimaru | H01G 9/028<br>427/80 |
| 2013/0059064 | A1* | 3/2013 | Majima | H01G 9/0036<br>427/80 |
| 2017/0148575 | A1* | 5/2017 | Tsubaki | H01G 9/035 |
| 2017/0294273 | A1* | 10/2017 | Andoralov | H01G 11/24 |
| 2022/0102082 | A1 | 3/2022 | Kubo et al. | |
| 2022/0162404 | A1 | 5/2022 | Kubo et al. | |
| 2025/0095923 | A1* | 3/2025 | Aoyama | H01G 9/035 |

FOREIGN PATENT DOCUMENTS

| | | | | |
|---|---|---|---|---|
| WO | WO-2015198546 | A1 * | 12/2015 | H01G 9/028 |
| WO | 2016/031207 | A1 | 3/2016 | |
| WO | 2020/158780 | A1 | 8/2020 | |
| WO | 2020/158783 | A1 | 8/2020 | |
| WO | WO-2022060460 | A1 * | 3/2022 | H01G 9/028 |
| WO | WO-2024181212 | A1 * | 9/2024 | H01G 9/02 |
| WO | WO-2025028067 | A1 * | 2/2025 | H01G 9/02 |
| WO | WO-2025028068 | A1 * | 2/2025 | H01G 9/02 |
| WO | WO-2025052792 | A1 * | 3/2025 | H01G 9/02 |

OTHER PUBLICATIONS

International Search Report (with English translation) and Written Opinion dated Apr. 11, 2023, from corresponding International Application No. PCT/JP2023/002692; 9 pages.

* cited by examiner

ELECTROLYTIC CAPACITOR AND METHOD FOR MANUFACTURING ELECTROLYTIC CAPACITOR

CROSS-REFERENCE TO RELATED APPLICATIONS

This application is the U.S. National Phase under 35 U.S.C. § 371 of International Application No. PCT/JP2023/002692, filed on Jan. 27, 2023, which claims the benefit of foreign priority to Japan Patent Application No. 2022-012070 filed on Jan. 28, 2022, the entire contents of each of which are hereby incorporated by reference.

TECHNICAL FIELD

The present disclosure relates to an electrolytic capacitor and a method for manufacturing an electrolytic capacitor.

BACKGROUND ART

An electrolytic capacitor that includes a wound body including an anode foil, a separator, and a cathode foil is known. An example of such an electrolytic capacitor includes a conductive polymer layer disposed inside the wound body.

PTL 1 (International Publication WO 2020/158780) discloses "a method for producing an electrolytic capacitor, the method including steps of: preparing an electrode foil; preparing a first conductive polymer dispersion containing a first conductive polymer component and a first dispersion medium; forming a first conductive polymer layer containing the first conductive polymer component by applying the first conductive polymer dispersion to a surface of the electrode foil by a coating method, and then at least partially removing the first dispersion medium; and fabricating a capacitor element using the electrode foil having the first conductive polymer layer."

PTL 2 (International Publication WO 2020/158783) discloses "a method for producing an electrolytic capacitor, the method including steps of: preparing an anode foil that includes a dielectric layer, a cathode foil, and a fiber structure; preparing a conductive polymer dispersion liquid that contains a conductive polymer component and a dispersion medium; producing a separator by applying the conductive polymer dispersion liquid to the fiber structure and then removing at least a portion of the dispersion medium; and producing a capacitor element by sequentially stacking the anode foil, the separator, and the cathode foil, wherein the dispersion medium contains water, the fiber structure contains a synthetic fiber in an amount of 50% by mass or more, and the fiber structure has a density of 0.2 g/cm$^3$ or more and less than 0.45 g/cm$^3$."

CITATION LIST

Patent Literature

PTL 1: International Publication WO 2020/158780
PTL 2: International Publication WO 2020/158783

SUMMARY OF INVENTION

Technical Problem

In an electrolytic capacitor in which an electrolyte solution is used as an electrolyte, the electrolyte between electrodes is lost due to evaporation of the electrolyte solution, and consequently, conduction paths finally disappear and the electrolytic capacitor enters an open state. However, in an electrolytic capacitor in which a conductive polymer is used, the conductive polymer does not evaporate and conduction paths between electrodes continue to be present. Accordingly, such an electrolytic capacitor in which a conductive polymer is used may not enter the open state even after the end of the service life of the electrolytic capacitor.

The present disclosure provides an electrolytic capacitor that includes a conductive polymer layer and of which the ESR becomes particularly high when an amount of a liquid component (e.g., electrolyte solution) contained in the electrolytic capacitor has decreased, and a method for manufacturing the electrolytic capacitor.

Solution to Problem

An aspect of the present disclosure relates to an electrolytic capacitor. The electrolytic capacitor includes a stacked body and a liquid component with which the stacked body is impregnated, wherein the stacked body includes an anode foil that having a dielectric layer formed on a surface thereof, a cathode foil, a separator disposed between the anode foil and the cathode foil, and conductive polymer layers, the conductive polymer layers include a first conductive polymer layer formed on the dielectric layer, a second conductive polymer layer formed on the cathode foil, and a third conductive polymer layer formed on the separator, the first conductive polymer layer and the third conductive polymer layer are in contact with each other at a first interface, the second conductive polymer layer and the third conductive polymer layer are in contact with each other at a second interface, and when an amount of the liquid component contained in the stacked body has decreased, a first electrical resistance between the first conductive polymer layer and the third conductive polymer layer and a second electrical resistance between the second conductive polymer layer and the third conductive polymer layer increase.

Another aspect of the present disclosure relates to a method for manufacturing an electrolytic capacitor. The method is a method for manufacturing an electrolytic capacitor including an anode foil having a dielectric layer formed on a surface thereof, a cathode foil, and a separator, and the method includes, in the following order: a polymer layer formation step of forming a first conductive polymer layer on the dielectric layer, a second conductive polymer layer on the cathode foil, and a third conductive polymer layer on the separator; a stacked body formation step of forming a stacked body by stacking the anode foil, the cathode foil, and the separator such that the separator is disposed between the anode foil and the cathode foil; and an impregnation step of impregnating the stacked body with a liquid component, wherein a first contact resistance between the first conductive polymer layer and the third conductive polymer layer and a second contact resistance between the second conductive polymer layer and the third conductive polymer layer are reduced through the impregnation step.

Advantageous Effects of Invention

According to the present disclosure, it is possible to obtain an electrolytic capacitor that includes a conductive polymer layer and of which the ESR becomes particularly high when an amount of a liquid component (e.g., electrolyte solution) contained in the electrolytic capacitor has decreased.

While novel features of the present invention are set forth in the appended claims, both the configuration and content of the present invention, as well as other objects and features of the present invention, will be better understood from the following detailed description given with reference to the drawings.

DESCRIPTION OF EMBODIMENTS

Figure 1:
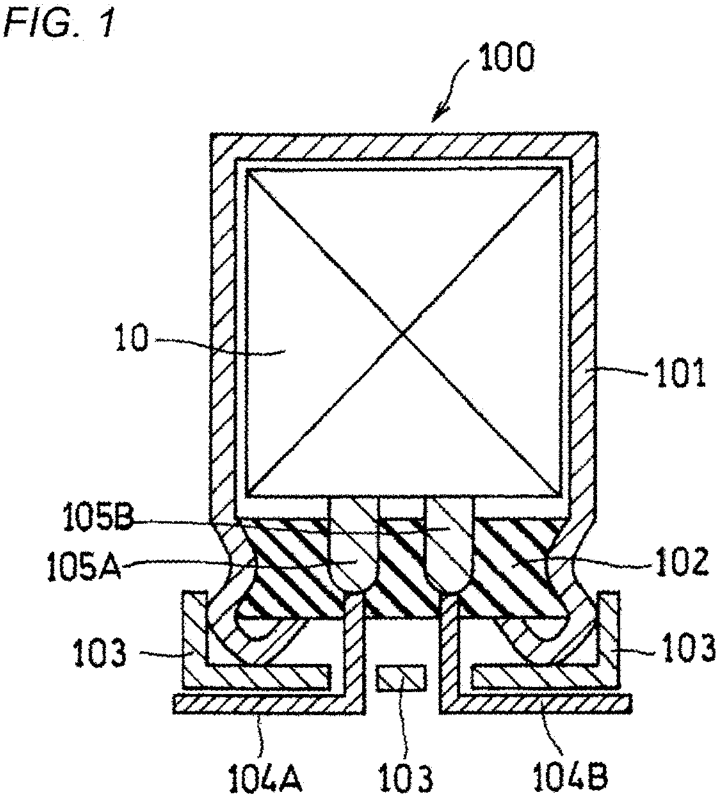
FIG. 1 is a side view schematically showing an electrolytic capacitor according to an embodiment of the present disclosure.

The following describes an example embodiment of the present invention, but the present invention is not limited to the following example. In the following description, specific numerical values and materials are given as examples in some cases, but other numerical values and other materials may also be applied as long as the invention according to the present disclosure can be implemented. In the specification, the expression "a numerical value A to a numerical value B" includes the numerical value A and the numerical value B, and can be read as "the numerical value A or more and the numerical value B or less". In the following description, if lower and upper limits of numerical values regarding specific physical properties or conditions are exemplified, any of the exemplified lower limits and any of the exemplified upper limits can be combined as desired as long as the lower limit is not equal to or greater than the upper limit.

(Method for Manufacturing Electrolytic Capacitor)

A manufacturing method according to an embodiment of the present disclosure is a method for manufacturing an electrolytic capacitor including an anode foil having a dielectric layer formed on a surface thereof, a cathode foil, and a separator. Hereinafter, the manufacturing method may also be referred to as a "manufacturing method (M)". The manufacturing method (M) includes a polymer layer formation step, a stacked body formation step, and an impregnation step in this order. The following describes these steps.

(Polymer Layer Formation Step)

The polymer layer formation step is a step of forming a first conductive polymer layer on the dielectric layer (the dielectric layer on the surface of the anode foil), a second conductive polymer layer on the cathode foil, and a third conductive polymer layer on the separator. Hereinafter, the surface of the dielectric layer on which the first conductive polymer layer is formed and the surface of the cathode foil on which the second conductive polymer layer is formed may be referred to as "surfaces(S)". The conductive polymer layers contain a conductive polymer component, which will be described later.

The polymer layer formation step may include a step (a) and a step (b). The step (a) is a step of applying an application liquid that contains the conductive polymer component and a liquid medium to the surfaces(S) and the separator. The step (b) is a step of forming the conductive polymer layers on the surfaces(S) and the separator by removing at least a portion of the liquid medium from the applied application liquid. The liquid medium may include water or may be water. The following describes the steps (a) and (b).

In the step (a), the application liquid is applied to dielectric layers formed on both surfaces of the anode foil, and the application liquid is applied to both surfaces of the cathode foil, as necessary. A conductive polymer layer is formed in regions to which the application liquid is applied. Examples of the conductive polymer component will be described later. The conductive polymer component may be dispersed in the state of particles in the application liquid.

There is no limitation on the method for applying the application liquid, and a known method may be used to apply the application liquid. For example, a method that uses a coater may be used, the application liquid may be sprayed, or an object to which the application liquid is to be applied may be immersed in the application liquid. Examples of the method that uses a coater include a gravure coating method and a die coating method. Note that methods for applying the application liquid to the separator include a method of impregnating the separator with the application liquid. The application liquid applied to the separator permeates the inside of the separator, and the conductive polymer layer can be formed in an entire region of the separator in its thickness direction.

There is no limitation on the method for removing the liquid medium in the step (b). The liquid medium may be removed through heating and/or by reducing a pressure, and it is preferable to perform at least heating. Heating may be performed at a temperature higher than or equal to 100° C., for example, within a range from 100° C. to 200° C.

In the step (b), the liquid medium may be removed so as to reduce the amount of liquid medium remaining in the conductive polymer layers. For example, the liquid medium may be removed such that the content of the liquid medium (e.g., water) in the conductive polymer layers falls within a range from 0 to 20% by mass (e.g., from 0 to 10% by mass). By sufficiently removing the liquid medium, it is possible to dry surfaces of the conductive polymer layers. Consequently, it is possible to suppress the occurrence of a situation in which the first conductive polymer layer and the third conductive polymer layer are indivisibly mixed over a wide range and the second conductive polymer layer and the third conductive polymer layer are indivisibly mixed over a wide range in the following steps.

The amount of the liquid medium (water) contained in the conductive polymer layers can be measured using a Karl Fischer method.

Note that the conductive polymer layers can be formed separately on each member. Accordingly, the application liquid may be applied to a member (step (a)) after another member is dried (step (b)). For example, the steps (a) and (b) for forming the conductive polymer layer on the anode foil (dielectric layer), the steps (a) and (b) for forming the conductive polymer layer on the cathode foil, and the steps (a) and (b) for forming the conductive polymer layer on the separator can be performed in a suitable order.

The first through third conductive polymer layers (the first, second, and third conductive polymer layers) may contain the same conductive polymer component or different conductive polymer components. In a preferred example, the first through third conductive polymer layers are constituted of the same conductive polymer component. The first through third conductive polymer layers may have the same electrical conductivity or different electrical conductivities.

For example, the third conductive polymer layer may have a higher electrical conductivity than the first and second conductive polymer layers.

The first conductive polymer layer is preferably formed in 80% or more (e.g., 90% or more) of the area of the surface of the anode foil. The second conductive polymer layer is preferably formed in 80% or more (e.g., 90% or more) of the area of the surface of the cathode foil. The first and second conductive polymer layers are preferably formed on entire surfaces of the electrode foils (the anode foil and the cathode foil) that contribute to the capacitance of a capacitor element, out of surfaces of the electrode foils. The area of the third conductive polymer layer formed on the separator is preferably 80% or more (e.g., 90% or more) of the area of the separator, and the third conductive polymer layer may be formed on the entire separator. Here, the area of a surface of an electrode foil (the anode foil or the cathode foil) is an area calculated without irregularities in the surface being taken into account, and can be calculated from an external shape of the electrode foil. When the first conductive polymer is formed on both surfaces of the electrode foil, the area of the surfaces on which the first conductive polymer is formed is the sum of the areas of both surfaces.

The mass of the first conductive polymer layer per unit area and the mass of the second conductive polymer layer per unit area may be 0.01 $mg/cm^2$ or more, or 0.02 $mg/cm^2$ or more, and may be 0.5 $mg/cm^2$ or less, or 0.3 $mg/cm^2$ or less. When the mass is 0.1 $mg/cm^2$ or more, the conductive polymer layers can be formed more uniformly. Note that, when the first conductive polymer layer is formed on both surfaces of the electrode foil, the above-described mass per unit area is the mass of the first conductive polymer layer formed on a surface of the electrode foil.

The mass of the third conductive polymer layer per unit area may be 0.02 $mg/cm^2$ or more, or 0.05 $mg/cm^2$ or more, and may be 2.0 $mg/cm^2$ or less, or 1.0 $mg/cm^2$ or less. When the mass is 0.3 $mg/cm^2$ or more, the conductive polymer layer can be formed more uniformly.

Note that the mass of a conductive polymer layer per unit area can be calculated using the following method. First, five samples each having a predetermined area are cut out from the member (the electrode foil or the separator) prior to the formation of the conductive polymer layer, and masses of the five samples are measured. Also, five samples each having the predetermined area are cut out from the member (the electrode foil or the separator) on which the conductive polymer layer has been formed, and masses of the samples are measured. The mass of the conductive polymer layer per unit area is calculated from the predetermined area and a difference between a sum of the masses of the five samples after the formation of the conductive polymer layer and a sum of the masses of the five samples prior to the formation of the conductive polymer layer.

(Stacked Body Formation Step)

The stacked body formation step is a step of forming a stacked body including the conductive polymer layers by stacking the anode foil, the cathode foil, and the separator such that the separator is disposed between the anode foil and the cathode foil.

There is no limitation on the method for forming the stacked body, and a known method may be used to form the stacked body. The stacked body may be a wound body. In this case, the wound body may be formed by winding together the anode foil, the cathode foil, and the separator such that the separator is disposed between the anode foil and the cathode foil in the stacked body formation step. In the wound body, the anode foil, the cathode foil, and the separator are stacked in a radial direction of the wound body.

The stacked body may be formed by stacking a flat anode foil, a flat cathode foil, and a flat separator in one direction. For example, it is also possible to form the stacked body by stacking a plurality of anode foils, a plurality of cathode foils, and a plurality of separators in one direction. In a typical example of such a stacked body, the anode foils and the cathode foils are alternately disposed, and the separators are disposed between the anode foils and the cathode foils.

(Impregnation Step)

The impregnation step is a step of impregnating the stacked body subjected to a removal step with a liquid component. Hereinafter, the liquid component may be referred to as a "liquid component (L)". In the manufacturing method (M), a first contact resistance between the first conductive polymer layer and the third conductive polymer layer and a second contact resistance between the second conductive polymer layer and the third conductive polymer layer are reduced through the impregnation step.

In the impregnation step, a first contact area in which the first conductive polymer layer and the third conductive polymer layer are in contact with each other and a second contact area in which the second conductive polymer layer and the third conductive polymer layer are in contact with each other increase. Consequently, the first and second contact resistances can be reduced.

There is no limitation on the method for impregnating the stacked body with the liquid component (L). For example, the stacked body may be impregnated with the liquid component (L) by immersing at least a portion of the stacked body in the liquid component (L). Examples of the liquid component (L) will be described later.

Through the steps described above, a capacitor element including the conductive polymer layers and the liquid component (L) is formed. Thereafter, the capacitor element is enclosed in an exterior body as necessary. Thus, an electrolytic capacitor is manufactured. Note that the manufacturing method (M) may also include a step other than the above-described steps as necessary.

The manufacturing method (M) may further include a liquid application step and a removal step after the stacked body formation step and before the impregnation step. The liquid application step is a step of impregnating the first through third conductive polymer layers in the stacked body with a liquid including water. Hereinafter, the liquid may be referred to as a "liquid(S)". The removal step is a step of removing at least a portion of the liquid(S) with which the first through third conductive polymer layers have been impregnated. The first contact area in which the first conductive polymer layer and the third conductive polymer layer are in contact with each other and the second contact area in which the second conductive polymer layer and the third conductive polymer layer are in contact with each other may be increased through the liquid application step.

It is preferable that the liquid(S) contains water as its major component (50% by mass or more). When a liquid(S) that contains water as its major component is used, it is possible to obtain a high effect. The liquid(S) may be water. The water content in the liquid may be 60% by mass or more, 80% by mass or more, 90% by mass or more, or 95% by mass or more, and is 100% by mass or less.

In the removal step, it is preferable to reduce the amount of water remaining in the stacked body. Accordingly, when the liquid(S) contains a liquid other than water, the liquid may be a liquid that can evaporate together with water. For example, the liquid contained in the liquid(S) other than water may be an organic solvent that has a boiling point lower than or equal to 100° C. and dissolves in water. In the present specification, the term "boiling point" means a boiling point under 1 atm (101325 Pa) unless otherwise stated. The organic solvent that dissolves in water is preferably an organic solvent that is miscible with water. Examples of the organic solvent that has a boiling point lower than or equal to 100° C. and dissolves in water include lower alcohols (methanol, ethanol, and propanol). Alternatively, the liquid(S) may contain an organic compound that causes no problem even when remaining in the conductive polymer layers. For example, the liquid(S) may contain an organic compound that does not boil at 100° C. under 1 atm. Hereinafter, the organic compound may be referred to as an "organic compound (C)".

Examples of the organic compound (C) include organic compounds that have a boiling point higher than 100° C. When the organic compound (C) has a boiling point, the boiling point may be 110° C. or higher, 150° C. or higher, or 200° C. or higher, and may be 400° C. or lower, 300° C. or lower, 250° C. or lower, or 200° C. or lower. The boiling point may be within a range from 110° C. to 400° C. (e.g., from 150° C. to 350° C.).

Examples of the organic compound (C) include polyhydric alcohols, sulfolane, γ-butyrolactone, and borate esters. The organic compound (C) may include at least one selected from the group consisting of polyhydric alcohols, sulfolane, γ-butyrolactone, and borate esters, and may also be at least one selected from the group. The organic compound (C) may include at least one selected from the group consisting of glycols, glycerins, sugar alcohols, sulfolane, γ-butyrolactone, and borate esters, and may also be at least one selected from the group. By leaving these organic compounds (C) in the conductive polymer layers, it is possible to reduce the ESR.

Examples of the polyhydric alcohols include glycols, glycerins, and sugar alcohols. Examples of the glycols include ethylene glycol, diethylene glycol, triethylene glycol, polyalkylene glycol (e.g., polyethylene glycol), and polyoxyethylene polyoxypropylene glycol (ethylene oxide-propylene oxide copolymer). Examples of the glycerins include glycerin and polyglycerins. Examples of the sugar alcohols include mannitol, xylitol, sorbitol, erythritol, and pentaerythritol.

There is no limitation on the method for impregnating the conductive polymer layers with the liquid(S). For example, it is possible to impregnate the conductive polymer layers with the liquid(S) by immersing at least a portion of the stacked body in the liquid(S).

The liquid(S) may contain a conductive polymer, but does not necessarily need to contain a conductive polymer. The liquid(S) acts on the conductive polymer layers, and accordingly, it is preferable that the liquid(S) does not substantially contain a conductive polymer. For example, the content of the conductive polymer in the liquid(S) may be less than 0.5% by mass, or less than 0.1% by mass.

(Removal Step)

The removal step may be a step of removing a portion of the liquid(S) with which the conductive polymer layers have been impregnated, such that the mass of the organic compound contained in the conductive polymer layers is larger than the mass of water contained in the conductive polymer layers. Characteristics of the electrolytic capacitor deteriorate with an increase in the amount of water remaining in the conductive polymer layers. Therefore, it is preferable to remove at least a portion of the liquid(S) in the removal step such that the amount of water remaining in the conductive polymer layers decreases.

By sufficiently removing water from the conductive polymer layers in the removal step, it is possible to dry surfaces of the conductive polymer layers. Consequently, it is possible to suppress the occurrence of a situation in which the first conductive polymer layer and the third conductive polymer layer are indivisibly mixed over a wide range and the second conductive polymer layer and the third conductive polymer layer are indivisibly mixed over a wide range in the following step.

The liquid(S) may be removed through heating and/or by reducing a pressure, and it is preferable to perform at least heating. When heating is performed, it is preferable to remove the liquid(S) through heating at a temperature higher than or equal to 100° C. When heating is performed at a temperature higher than or equal to 100° C., it is possible to rapidly remove water contained in the liquid(S). The heating temperature may be 100° C. or higher, 120° C. or higher, or 140° C. or higher, and may be 250° C. or lower, 200° C. or lower, or 160° C. or lower. The heating temperature may be within a range from 100° C. to 200° C. (e.g., from 100° C. to 160° C.). The heating time is not particularly limited as long as a portion of the liquid(S) can be removed appropriately. For example, the heating time is within a range from 5 to 60 minutes.

The water content in the liquid(S) contained in the conductive polymer layers may be set to 100% by mass or less (e.g., 50% by mass or less, or 30% by mass or less) by performing the removal step.

(Application Liquid)

The application liquid used in the polymer layer formation step contains the conductive polymer component and the liquid medium. The application liquid may also contain another component as necessary. The liquid medium may include water or may be water. The application liquid may be a dispersion liquid in which particles of the conductive polymer component are dispersed.

The conductive polymer component includes a conductive polymer, and may be constituted of only the conductive polymer. Alternatively, the conductive polymer component may include a conductive polymer and a dopant.

Examples of the conductive polymer include polypyrrole, polythiophene, polyfuran, polyaniline, polyacetylene, and derivatives thereof. Examples of the derivatives include polymers that include polypyrrole, polythiophene, polyfuran, polyaniline, or polyacetylene as the basic skeleton. Examples of derivatives of polythiophene include poly(3,4-ethylenedioxythiophene). Any one of these conductive polymers may be used alone, or two or more of these may be used in combination. Also, the conductive polymer may be a copolymer of two or more monomers. The weight average molecular weight of the conductive polymer is not particularly limited, and may be within a range from 1000 to 100000, for example. A preferred example of the conductive polymer is poly(3,4-ethylenedioxythiophene) (PEDOT).

The conductive polymer may be doped with a dopant. From the standpoint of suppressing de-doping from the conductive polymer, it is preferable to use a polymer dopant as the dopant. Examples of the polymer dopant include polyvinyl sulfonic acid, polystyrene sulfonic acid, polyallyl sulfonic acid, polyacryl sulfonic acid, polymethacryl sulfonic acid, poly(2-acrylamido-2-methylpropanesulfonic acid), polyisoprene sulfonic acid, and polyacrylic acid. Any one of these may be used alone, or two or more of these may be used in combination. At least some of these may be added in the form of a salt. A preferred example of the dopant is polystyrene sulfonic acid (PSS).

In the electrolytic capacitor according to the present disclosure, the dopant may be a dopant that contains an acidic group or a polymer dopant that contains an acidic group. Examples of the acidic group include a sulfonic acid group and a carboxyl group. The polymer dopant containing an acidic group is a polymer in which at least some constituent units contain an acidic group. Examples of such a polymer dopant include the polymer dopants described above.

The weight average molecular weight of the dopant is not particularly limited. From the standpoint of facilitating formation of a uniform conductive polymer layer, the weight average molecular weight of the dopant may be within a range from 1000 to 100000.

The dopant may be polystyrene sulfonic acid, and the conductive polymer may be poly(3,4-ethylenedioxythiophene). That is to say, the conductive polymer component may be poly(3,4-ethylenedioxythiophene) doped with polystyrene sulfonic acid. When the conductive polymer doped with the dopant is used, the pH of the application liquid is preferably less than 7.0 in order to suppress de-doping of the dopant, and may be 6.0 or less, or 5.0 or less. The pH of the application liquid may be 1.0 or more, or 2.0 or more.

The water content in the application liquid may be 50% by mass or more, 80% by mass or more, 90% by mass or more, 96% by mass or more, or 97% by mass or more. The content may be 99.5% by mass or less. The content may be within a range from 50 to 99.5% by mass, a range from 96 to 99.5% by mass, or a range from 97 to 99.5% by mass.

The content of the conductive polymer component in the application liquid may be 0.5% by mass or more, or 1.0% by mass or more, and may be 4.0% by mass or less, 3.0% by mass or less, or 2.0% by mass or less. The content may be within a range from 0.5 to 4.0% by mass or a range from 1.0 to 4.0% by mass. The upper limit of any of these ranges may be replaced with 3.0% by mass or 2.0% by mass. The content is preferably within a range from 1.0 to 3.0% in terms of achieving excellent physical properties of the application liquid, excellent stability of the physical properties over time, and a good balance between the ESR of the electrolytic capacitor and the cost. When the application liquid contains a dopant, the mass of the dopant is included in the mass of the conductive polymer component.

The water content and the content of the conductive polymer component described above can be combined suitably unless no contradiction arises. An example of the application liquid may satisfy one or two conditions suitably selected from the following conditions (1) to (3) or satisfy all the conditions.

(1) The water content is within a range from 96 to 99.5% by mass (e.g., from 97 to 99.5% by mass), and the content of the conductive polymer component is within a range from 0.5 to 4.0% by mass (e.g., from 1.0 to 3.0% by mass).

(2) The conductive polymer component includes poly(3,4-ethylenedioxythiophene) and polystyrene sulfonic acid. For example, the conductive polymer component may be constituted of poly(3,4-ethylenedioxythiophene) and polystyrene sulfonic acid.

(3) The pH of the application liquid is within a range from 1.0 to 6.0 (e.g., from 2.0 to 5.0). The application liquid may satisfy the conditions (2) and (3) described above. When the conditions (2) and (3) are satisfied, it is possible to form conductive polymer layers that have high conductivity.

(Liquid Component (L))

Examples of the liquid component (L) used in the impregnation step include a nonaqueous solvent and an electrolyte solution. It is possible to use an electrolyte solution that contains a nonaqueous solvent and a solute dissolved in the nonaqueous solvent. In the present specification, the liquid component (L) may be a component that is liquid at room temperature (25° C.) or a component that is liquid at a temperature at which the electrolytic capacitor is used.

The nonaqueous solvent used in the liquid component (L) may be an organic solvent, an ionic liquid, or a protic solvent. Examples of the nonaqueous solvent include polyhydric alcohols such as ethylene glycol and propylene glycol, cyclic sulfones such as sulfolane (SL), lactones such as γ-butyrolactone (γBL), amides such as N-methylacetamide, N,N-dimethylformamide, and N-methyl-2-pyrrolidone, esters such as methyl acetate, carbonate compounds such as propylene carbonate, ethers such as 1,4-dioxane, ketones such as methyl ethyl ketone, and formaldehyde.

It is also possible to use a polymer-based solvent as the nonaqueous solvent. Examples of the polymer-based solvent include polyalkylene glycol, derivatives of polyalkylene glycol, and compounds in which at least one hydroxyl group of a polyhydric alcohol is substituted with polyalkylene glycol (including derivatives thereof). Specific examples of the polymer-based solvent include polyethylene glycol (PEG), polyethylene glycol glyceryl ether, polyethylene glycol diglyceryl ether, polyethylene glycol sorbitol ether, polypropylene glycol, polypropylene glycol glyceryl ether, polypropylene glycol diglyceryl ether, polypropylene glycol sorbitol ether, and polybutylene glycol. Examples of the polymer-based solvent further include ethylene glycol-propylene glycol copolymer, ethylene glycol-butylene glycol copolymer, and propylene glycol-butylene glycol copolymer. A nonaqueous solvent may be used alone, or a mixture of two or more nonaqueous solvents may be used.

The liquid component (L) may contain the nonaqueous solvent and a base component (base) dissolved in the nonaqueous solvent. Also, the liquid component (L) may contain the nonaqueous solvent and a base component and/or an acid component (acid) dissolved in the nonaqueous solvent.

As the acid component, it is possible to use a polycarboxylic acid and a monocarboxylic acid. Examples of the polycarboxylic acid include aliphatic polycarboxylic acid ([saturated polycarboxylic acid such as oxalic acid, malonic acid, succinic acid, glutaric acid, adipic acid, pimelic acid, suberic acid, azelaic acid, sebacic acid, 1,6-decanedicarboxylic acid, and 5,6-decanedicarboxylic acid]; [unsaturated polycarboxylic acid such as maleic acid, fumaric acid, and itaconic acid]), aromatic polycarboxylic acid (e.g., phthalic acid, isophthalic acid, terephthalic acid, trimellitic acid, and pyromellitic acid), alicyclic polycarboxylic acid (e.g., cyclohexane-1,2-dicarboxylic acid and cyclohexene-1,2-dicarboxylic acid).

Examples of the monocarboxylic acid include aliphatic monocarboxylic acid (having 1 to 30 carbon atoms) ([saturated monocarboxylic acid such as formic acid, acetic acid, propionic acid, butyric acid, isobutyric acid, valeric acid, caproic acid, enanthic acid, caprylic acid, pelargonic acid, lauryl acid, myristic acid, stearic acid, and behenic acid]; [unsaturated monocarboxylic acid such as acrylic acid, methacrylic acid, and oleic acid]), aromatic monocarboxylic acid (e.g., benzoic acid, cinnamic acid, and naphthoic acid), and oxycarbonic acid (e.g., salicylic acid, mandelic acid, and resorcinol acid).

Among these, maleic acid, phthalic acid, benzoic acid, pyromellitic acid, and resorcinol acid are thermally stable and preferably used.

An inorganic acid may also be used as the acid component. Representative examples of the inorganic acid include phosphoric acid, phosphorous acid, hypophosphorous acid, alkyl phosphate, boric acid, borofluoric acid, tetrafluoroboric acid, hexafluorophosphoric acid, benzenesulfonic acid, and naphthalenesulfonic acid. It is also possible to use a composite compound of an organic acid and an inorganic acid as the acid component. Examples of such a composite compound include borodiglycolic acid, borodisuccinic acid, and borodisalicylic acid.

The base component may be a compound that has an alkyl-substituted amidine group such as imidazole compound, benzoimidazole compound, or alicyclic amidine compound (pyrimidine compound or imidazoline compound). Specifically, the base component is preferably 1,8-diazabicyclo[5,4,0]undecene-7,1,5-diazabicyclo[4,3,0]nonene-5,1,2-dimethylimidazolinium, 1,2,4-trimethylimidazoline, 1-methyl-2-ethyl-imidazoline, 1,4-dimethyl-2-ethylimidazoline, 1-methyl-2-heptylimidazoline, 1-methyl-2-(3'heptyl) imidazoline, 1-methyl-2-dodecylimidazoline, 1,2-dimethyl-1,4,5,6-tetrahydropyrimidine, 1-methylimidazole, or 1-methylbenzoimidazole. With use of these, it is possible to obtain a capacitor that has excellent impedance performance.

A quaternary salt of a compound that has an alkyl-substituted amidine group may also be used as the base component. Examples of such a base component include an imidazole compound, a benzoimidazole compound, and an alicyclic amidine compound (a pyrimidine compound or an imidazoline compound), which are quaternized by an alkyl group or arylalkyl group having 1 to 11 carbon atoms. Specifically, the base component is preferably 1-methyl-1,8-diazabicyclo[5,4,0]undecene-7,1-methyl-1,5-diazabicyclo[4,3,0]nonene-5,1,2,3-trimethylimidazolinium, 1,2,3,4-tetramethylimidazolinium, 1,2-dimethyl-3-ethyl-imidazolinium, 1,3,4-trimethyl-2-ethylimidazolinium, 1,3-dimethyl-2-heptylimidazolinium, 1,3-dimethyl-2-(3'heptyl) imidazolinium, 1,3-dimethyl-2-dodecylimidazolinium, 1,2,3-trimethyl-1,4,5,6-tetrahydropyrimidium, 1,3-dimethylimidazolium, 1-methyl-3-ethylimidazolium, or 1,3-dimethylbenzoimidazolium. With use of these, it is possible to obtain a capacitor that has excellent impedance performance.

It is also possible to use a tertiary amine as the base component. Examples of the tertiary amine include trialkylamines (e.g., trimethylamine, dimethylethylamine, methyldiethylamine, triethylamine, dimethyl-n-propylamine, dimethylisopropylamine, methylethyl-n-propylamine, methylethylisopropylamine, diethyl-n-propylamine, diethylisopropylamine, tri-n-propylamine, triisopropylamine, tri-n-butylamine, and tri-tert-butylamine), and phenyl group-containing amines (e.g., dimethylphenylamine, methylethylphenylamine, and diethylphenylamine). Among these, trialkylamines are preferable in terms of achieving high conductivity, and it is more preferable that the base component includes at least one selected from the group consisting of trimethylamine, dimethylethylamine, methyldiethylamine, and triethylamine. It is also possible to use secondary amines such as dialkylamines, primary amines such as monoalkylamine, or ammonia as the base component.

The liquid component (L) may contain a salt of an acid component and a base component. The salt may be an inorganic salt and/or an organic salt. An organic salt is a salt in which at least one of the anion and the cation contains an organic substance. For example, it is possible to use, as the organic salt, trimethylamine maleate, triethylamine borodisalicylate, ethyldimethylamine phthalate, mono-1,2,3,4-tetramethylimidazolinium phthalate, or mono-1,3-dimethyl-2-ethylimidazolinium phthalate.

In order to suppress de-doping of the dopant, the pH of the liquid component (L) may be less than 7.0, or 5.0 or less, and may be 1.0 or more, or 2.0 or more. The pH may be 1.0 or more and less than 7.0 (e.g., within a range from 2.0 to 5.0).

It is preferable that the liquid component (L) contains a protic solvent. When the liquid component (L) contains a protic solvent, a high effect can be obtained. The liquid component (L) may also contain a solvent other than the protic solvent, in addition to the protic solvent.

The protic solvent may include at least one selected from the group consisting of glycols, glycerin, polyglycerins, and sugar alcohols, and may also be at least one selected from the group. The protic solvent may be constituted of a single compound alone or may include a plurality of compounds.

(Electrolytic Capacitor)

Hereinafter, an electrolytic capacitor according to an embodiment of the present disclosure may be referred to as an "electrolytic capacitor (E)". The electrolytic capacitor (E) can be manufactured using the manufacturing method (M). However, the electrolytic capacitor (E) may be manufactured using a method other than the manufacturing method (M). Matters described regarding the manufacturing method (M) can also be applied to the electrolytic capacitor (E), and therefore, redundant descriptions thereof may be omitted. Also, matters described regarding the electrolytic capacitor (E) may also be applied to the manufacturing method (M).

The electrolytic capacitor (E) includes a stacked body and a liquid component with which the stacked body is impregnated. The liquid component is the liquid component (L) described above. The stacked body includes an anode foil having a dielectric layer formed on a surface thereof, a cathode foil, a separator disposed between the anode foil and the cathode foil, and conductive polymer layers.

The conductive polymer layers include a first conductive polymer layer formed on the dielectric layer, a second conductive polymer layer formed on the cathode foil, and a third conductive polymer layer formed on the separator. The first conductive polymer layer and the third conductive polymer layer are in contact with each other at a first interface. The second conductive polymer layer and the third conductive polymer layer are in contact with each other at a second interface. When the amount of the liquid component (L) contained in the stacked body has decreased, a first electrical resistance between the first conductive polymer layer and the third conductive polymer layer and a second electrical resistance between the second conductive polymer layer and the third conductive polymer layer increase.

Examples of states in which the first and second electrical resistances increase include a state in which conductivity due to contact between the first conductive polymer layer and the third conductive polymer layer and conductivity due to contact between the second conductive polymer layer and the third conductive polymer layer decrease when the amount of the liquid component (L) contained in the stacked body has decreased.

In the electrolytic capacitor (E), the first conductive polymer layer and the third conductive polymer layer are kept from being indivisibly mixed with each other over a wide range, and the second conductive polymer layer and the third conductive polymer layer are kept from being indivisibly mixed with each other over a wide range. Therefore, it is possible to significantly increase the first and second electrical resistances when the amount of the liquid component (L) contained in the stacked body (conductive polymer) has decreased. Accordingly, it is possible to make the ESR of the electrolytic capacitor (E) particularly high when the amount of the liquid component (L) has decreased and the electrolytic capacitor (E) has reached the end of its service life. Consequently, when the electrolytic capacitor (E) has reached the end of its service life, the electrolytic capacitor (E) can enter the open state or a state that is substantially approximate to the open state.

In the electrolytic capacitor (E), the first and second electrical resistances may increase due to shrinkage and/or oxidation of the first through third conductive polymer layers when the amount of the liquid component (L) contained in the stacked body has decreased. The first and second electrical resistances may increase due to an increase in the first contact resistance between the first conductive polymer layer and the third conductive polymer layer and an increase in the second contact resistance between the second conductive polymer layer and the third conductive polymer layer.

When the first through third conductive polymer layers shrink, a contact area at the first interface and a contact area at the second interface decrease, and the first and second electrical resistances increase. When the first through third conductive polymer layers (conductive polymer component) are oxidized, conductivity at the surfaces of the conductive polymer layers particularly decreases. As a result, even if the conductive polymer layers are in contact with each other, contact resistances at the first and second interfaces particularly increase, and the first and second electrical resistances increase. Note that the first through third conductive polymer layers may separate from each other when the conductive polymer layers shrink.

It is preferable that, due to a reduction in the amount of the liquid component (L), the equivalent series resistance (ESR) of the electrolytic capacitor (E) becomes at least 1000 times an equivalent series resistance prior to the reduction in the amount of the liquid component (L). The ESR prior to the reduction in the amount of the liquid component (L) is the ESR (hereinafter may be denoted by "R0") of an electrolytic capacitor (E0) that was produced within past 30 days and is placed in an ordinary environment (e.g., 40° C. or lower), for example. When the amount of the liquid component (L) contained in the electrolytic capacitor (E) has decreased by 10% by mass or more, for example, the electrolytic capacitor is referred to as an electrolytic capacitor (E1) in which the amount of the liquid component (L) has decreased. The ESR of the electrolytic capacitor (E1) may be denoted by R1. A ratio R1/R0 between R1 and R0 may be 1000 or more, or 5000 or more. There is no particular limitation on the upper limit of the ratio R1/R0. R0 may be within a range from 5.0 to 50 mΩ (e.g., from 10 to 30 m (2). R1 may be 5.0 Ω or more (e.g., 10Ω or more).

The conductive polymer layers contain a conductive polymer component. The first conductive polymer layer, the second conductive polymer layer, and the third conductive polymer layer may each contain poly(3,4-ethylenedioxythiophene) and polystyrene sulfonic acid.

The stacked body may be a wound body. In this case, the anode foil, the cathode foil, and the separator may be wound such that the separator is disposed between the anode foil and the cathode foil. As described above, the stacked body may be formed by stacking a flat anode foil, a flat cathode foil, and a flat separator in one direction.

The following describes an example of the configuration and constituent elements of the electrolytic capacitor (E) manufactured using the manufacturing method (M). An example electrolytic capacitor described below includes a capacitor element, an exterior body, an anode lead terminal, and a cathode lead terminal. Note that the configuration and constituent elements of the electrolytic capacitor (E) are not limited to those in the following example.

The electrolytic capacitor (E) includes a stacked body and a liquid component (L) with which the stacked body is impregnated. The stacked body includes a conductive polymer layer. The stacked body functions as a capacitor element. The stacked body includes an anode foil having a dielectric layer formed on a surface thereof, a cathode foil, and a separator. The electrolytic capacitor (E) usually includes an exterior body in which the stacked body is enclosed.

(Anode Foil)

Examples of the anode foil include metal foils containing at least one valve metal such as titanium, tantalum, aluminum, and niobium, and the anode foil may be a metal foil of a valve metal (for example, an aluminum foil). The anode foil may contain a valve metal in the form of an alloy containing the valve metal, a compound containing the valve metal, or the like. The thickness of the anode foil may be 15 μm or more and 300 μm or less. A surface of the anode foil may be roughened by etching or the like.

A dielectric layer is formed on the surface of the anode foil. The dielectric layer may be formed by subjecting the anode foil to chemical conversion treatment. In this case, the dielectric layer may contain an oxide of a valve metal (for example, an aluminum oxide). The dielectric layer only needs to function as a dielectric and may be formed of any dielectric other than an oxide of a valve metal.

The electrolytic capacitor may have a configuration in which the conductive polymer layer is not formed on edge surfaces of the anode foil. On the other hand, it is desirable that the dielectric layer is formed on the edge surfaces of the anode foil.

(Cathode Foil)

The cathode foil is not particularly limited as long as it functions as a cathode. Examples of the cathode foil include a metal foil (for example, an aluminum foil). The type of the metal is not particularly limited, and the metal may be a valve metal or an alloy containing a valve metal. The thickness of the cathode foil may be 15 μm or more and 300 μm or less. A surface of the cathode foil may be roughened or subjected to chemical conversion treatment as necessary.

The cathode foil may include a conductive coating layer. When the metal foil used for the cathode foil contains a valve metal, the coating layer may contain carbon and at least one metal having a lower ionization tendency than the valve metal. This makes it easier to improve the acid resistance of the metal foil. When the metal foil contains aluminum, the coating layer may contain at least one selected from the group consisting of carbon, nickel, titanium, tantalum, and zirconium. In particular, nickel and/or titanium may be contained in the coating layer in terms of their low cost and low resistance.

The thickness of the coating layer may be 5 nm or more, or 10 nm or more, and may be 200 nm or less. The coating layer may be formed on the metal foil by performing vapor deposition or sputtering using the above metal. Alternatively, the coating layer may be formed on the metal foil by performing vapor deposition using a conductive carbon material or applying a carbon paste containing a conductive carbon material. Examples of the conductive carbon material include graphite, hard carbon, soft carbon, carbon black, and the like.

(Separator)

A porous sheet can be used as the separator. Examples of the porous sheet include woven fabric, nonwoven fabric, and a microporous membrane. The thickness of the separator is not particularly limited and may be within a range from 10 to 300 μm. Examples of a material for the separator include cellulose, polyethylene terephthalate, polybutylene terephthalate, polyphenylene sulfide, vinylon, nylon, aromatic polyamide, polyimide, polyamide imide, polyetherimide, rayon, glass, and the like.

(Exterior Body)

The exterior body includes a case and/or a sealing resin. There is no limitation on the case and the sealing resin, and it is possible to use a known case and a known sealing resin. The sealing resin may include a thermosetting resin. Examples of the thermosetting resin include epoxy resin, phenolic resin, silicone resin, melamine resin, urea resin, alkyd resin, polyurethane, polyimide, unsaturated polyester, and the like. The sealing resin may contain a filler, a curing agent, a polymerization initiator, and/or a catalyst, for example.

Hereinafter, an example of the present disclosure will be specifically described with reference to the drawings. The constituent elements described above can be applied to constituent elements of the following example. Also, the constituent elements of the following example can be modified based on the above description. Also, matters described below may be applied to the embodiment described above. In the following example, constituent elements that are not essential to the electrolytic capacitor according to the present disclosure may be omitted.

Figure 2:
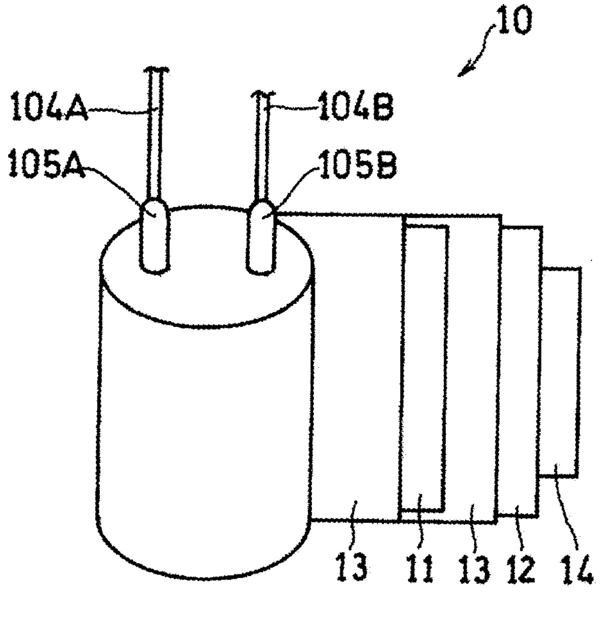
FIG. 2 is an exploded perspective view schematically showing a capacitor element according to an embodiment of the present disclosure.
Figure 3:
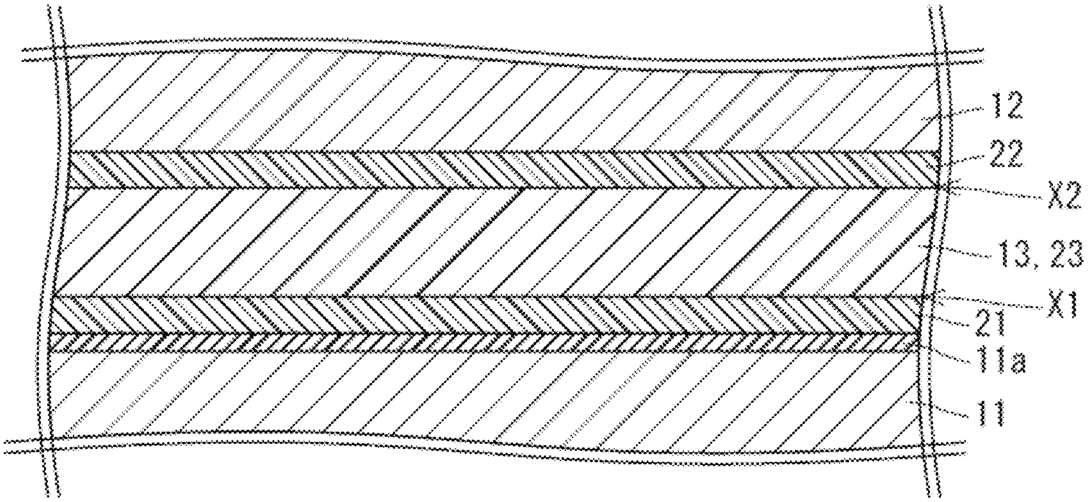
FIG. 3 is a cross-sectional view schematically showing a stacked body according to an embodiment of the present disclosure.

FIG. 1 is a cross-sectional view schematically showing an example of an electrolytic capacitor 100 according to the present embodiment. FIG. 2 is a schematic diagram in which a portion of a capacitor element 10 included in the electrolytic capacitor 100 is spread. FIG. 3 is a cross-sectional view of a stacked body.

The electrolytic capacitor 100 includes the capacitor element 10, a bottomed case 101 in which the capacitor element 10 is housed, a sealing member 102 sealing an opening of the bottomed case 101, a base plate 103 covering the sealing member 102, lead wires 104A and 104B drawn out from the sealing member 102 and passing through the base plate 103, and lead tabs 105A and 105B connecting the lead wires and electrodes of the capacitor element 10. The vicinity of an open end of the bottomed case 101 is pressed inward through drawing, and the open end is curled so as to be swaged on the sealing member 102.

The capacitor element 10 is a wound body like that shown in FIG. 1, for example. The wound body includes an anode foil 11 connected to the lead tab 105A, a cathode foil 12 connected to the lead tab 105B, and a separator 13. The electrolytic capacitor 100 includes the liquid component (L) (e.g., an electrolyte solution) with which the capacitor element 10 is impregnated. The capacitor element 10 includes the conductive polymer layers described above (not shown).

A dielectric layer (not shown) is formed on a surface of the anode foil 11. The anode foil 11 and the cathode foil 12 are wound with the separator 13 disposed therebetween. The outermost turn of the wound body is fixed with a winding end tape 14. Note that FIG. 1 shows a state in which a portion of the wound body is spread before the outermost turn of the wound body is fixed.

FIG. 3 is a partial cross-sectional view of a stacked body including an anode foil 11 having a dielectric layer 11*a* formed on a surface thereof, a cathode foil 12, a separator 13 disposed between the anode foil 11 and the cathode foil 12, and conductive polymer layers. The conductive polymer layers include a first conductive polymer layer 21 formed on the dielectric layer 11*a*, a second conductive polymer layer 22 formed on the cathode foil 12, and a third conductive polymer layer 23 formed on the separator 13. The third conductive polymer layer 23 may be formed over the entire thickness region of the separator 13.

The first conductive polymer layer 21 and the third conductive polymer layer 23 are in contact with each other at a first interface X1. The second conductive polymer layer 22 and the third conductive polymer layer 23 are in contact with each other at a second interface X2.

The electrolytic capacitor only needs to include at least one capacitor element, and may include a plurality of capacitor elements. The number of capacitor elements included in the electrolytic capacitor can be determined depending on the application.

INDUSTRIAL APPLICABILITY

The present disclosure can be applied to electrolytic capacitors.

Although the present invention has been described with respect to a presently preferred embodiment, such disclosure should not be interpreted as limiting the present invention. Various modifications and alterations will undoubtedly become apparent to those skilled in the art to which the present invention pertains upon reading the above disclosure. Therefore, the appended claims should be interpreted to include all modifications and alterations without departing from the true spirit and scope of the present invention.

REFERENCE SIGNS LIST

10: capacitor element, 11: anode foil, 12: cathode foil, 13: separator, 14: winding end tape, 100: electrolytic capacitor, 101: bottomed case, 102: sealing member, 103: base plate, 104A, 104B: lead wire, 105A, 105B: lead tab

The invention claimed is:

1. An electrolytic capacitor comprising:

a stacked body; and a liquid component with which the stacked body is impregnated, wherein the stacked body includes an anode foil having a dielectric layer formed on a surface thereof, a cathode foil, a separator disposed between the anode foil and the cathode foil, and conductive polymer layers, the conductive polymer layers include a first conductive polymer layer formed on the dielectric layer, a second conductive polymer layer formed on the cathode foil, and a third conductive polymer layer formed on the separator, the first conductive polymer layer and the third conductive polymer layer are in contact with each other at a first interface without being indivisibly mixed, the second conductive polymer layer and the third conductive polymer layer are in contact with each other at a second interface without being indivisibly mixed, and when an amount of the liquid component contained in the stacked body has decreased, a first electrical resistance between the first conductive polymer layer and the third conductive polymer layer and a second electrical resistance between the second conductive polymer layer and the third conductive polymer layer increase due to oxidation of the first, second and third conductive polymer layers or due to shrinkage and oxidation of the first, second and third conductive polymer layers.

2. The electrolytic capacitor according to claim 1, wherein, due to a reduction in the amount of the liquid component, an equivalent series resistance of the electrolytic capacitor becomes at least 1000 times an equivalent series resistance prior to the reduction in the amount of the liquid component.

3. The electrolytic capacitor according to claim 1, wherein the first conductive polymer layer, the second conductive polymer layer, and the third conductive polymer layer each contain poly(3,4-ethylenedioxythiophene) and polystyrene sulfonic acid.

4. The electrolytic capacitor according to claim 1, wherein the stacked body is a wound body, and the anode foil, the cathode foil, and the separator are wound such that the separator is disposed between the anode foil and the cathode foil.

5. The electrolytic capacitor according to claim 1, wherein the electrolytic capacitor is produced by a manufacturing method comprising, in the following order:

a polymer layer formation step of forming the first conductive polymer layer on the dielectric layer, the second conductive polymer layer on the cathode foil, and the third conductive polymer layer on the separator;

a stacked body formation step of forming the stacked body by stacking the anode foil, the cathode foil, and the separator such that the separator is disposed between the anode foil and the cathode foil; and an impregnation step of impregnating the stacked body with the liquid component.

6. The electrolytic capacitor according to claim 1, wherein when the amount of the liquid component contained in the stacked body has decreased, the first electrical resistance between the first conductive polymer layer and the third conductive polymer layer and the second electrical resistance between the second conductive polymer layer and the third conductive polymer layer increase due to the oxidation of the first, second and third conductive polymer layers.

7. The electrolytic capacitor according to claim 1, wherein when the amount of the liquid component contained in the stacked body has decreased, the first electrical resistance between the first conductive polymer layer and the third conductive polymer layer and the second electrical resistance between the second conductive polymer layer and the third conductive polymer layer increase due to the shrinkage and the oxidation of the first, second and third conductive polymer layers.

8. A method for manufacturing an electrolytic capacitor including an anode foil having a dielectric layer formed on a surface thereof, a cathode foil, and a separator, the method comprising, in the following order:

a polymer layer formation step of forming a first conductive polymer layer on the dielectric layer, a second conductive polymer layer on the cathode foil, and a third conductive polymer layer on the separator;

a stacked body formation step of forming a stacked body by stacking the anode foil, the cathode foil, and the separator such that the separator is disposed between the anode foil and the cathode foil; and an impregnation step of impregnating the stacked body with a liquid component, wherein, in the impregnation step, the first conductive polymer layer and the third conductive polymer layer are brought into contact without being indivisibly mixed, and the second conductive polymer layer and the third conductive polymer layer are brought into contact without being indivisibly mixed, thereby reducing a first contact resistance between the first conductive polymer layer and the third conductive polymer layer and a second contact resistance between the second conductive polymer layer and the third conductive polymer layer, and when an amount of the liquid component contained in the stacked body has decreased, a first electrical resistance between the first conductive polymer layer and the third conductive polymer layer and a second electrical resistance between the second conductive polymer layer and the third conductive polymer layer increase due to oxidation of the first, second and third conductive polymer layers or due to shrinkage and oxidation of the first, second and third conductive polymer layers.

9. The method for manufacturing an electrolytic capacitor according to claim 8, further comprising, before the impregnation step:

a liquid application step of impregnating the first through third conductive polymer layers included in the stacked body with a liquid including water; and a removal step of removing at least a portion of the liquid with which the first through third conductive polymer layers have been impregnated.

10. The method for manufacturing an electrolytic capacitor according to claim 9, wherein the first contact resistance and the second contact resistance are decreased through the liquid application step, and the first contact resistance and the second contact resistance are increased through the removal step.

11. The method for manufacturing an electrolytic capacitor according to claim 8, wherein the stacked body is a wound body, and the wound body is formed by winding the anode foil, the cathode foil, and the separator in the stacked body formation step such that the separator is disposed between the anode foil and the cathode foil.

* * * * *